W. L. R. EMMET.
ELECTRIC SHIP PROPULSION.
APPLICATION FILED JAN. 2, 1915.

1,214,528.

Patented Feb. 6, 1917.
3 SHEETS—SHEET 3.

Witnesses:
Lester H. Fulmer.
J. Ellis Glen

Inventor:
William L. R. Emmet,
by Albert G. Davis
His Attorney.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

ELECTRIC SHIP PROPULSION.

1,214,528.  Specification of Letters Patent.  Patented Feb. 6, 1917.

Application filed January 2, 1915. Serial No. 95.

*To all whom it may concern:*

Be it known that I, WILLIAM L. R. EMMET, a citizen of the United States, residing at Schenectady, in the county of Schenectady, State of New York, have invented certain new and useful Improvements in Electric Ship Propulsion, of which the following is a specification.

My invention relates to systems of electric ship propulsion, and has for its principal object the provision of an improved arrangement of apparatus for propelling a ship by electric power, and further the provision of an improved controlling apparatus for such a system.

My invention is more particularly concerned with systems of electric ship propulsion in which the propeller shafts are driven by alternating current motors receiving electric energy from alternators driven by elastic fluid turbines.

A further object of my invention is to provide a novel and improved controlling apparatus in a system of electric ship propulsion in which two or more motors are adapted to be supplied with electric energy from a plurality of generators.

In this connection an object of my invention is to provide improved means for controlling the supply of energy from any generator to any motor or motors, and further to provide such an arrangement of interlocking and safety devices that it will be impossible for an operator at a central point of control to make a disastrous connection.

Another object of my invention is to provide a novel and improved method of and apparatus for operating a system of electric ship propulsion during maneuvering and reversing movements of the ship.

Other objects of my present invention will be apparent to those skilled in the art from the following description and appended claims.

In propelling ships, particularly those of larger size, by electric motors, it is desirable to use alternating current since the motors and the generators for alternating currents are simpler than those for direct current, and since the generators can be conveniently designed for larger capacities and higher speeds, and are, therefore, better adapted for use with steam turbines. Alternating current motors of the simplest type require no commutators and can be constructed and wound in such a manner that they will stand the roughest usage with a minimum of trouble and expense for maintenance. Such alternating current motors, however, are best adapted to operate at a speed synchronous or nearly synchronous with the speed of the generator and, therefore, where such motors are used it is desirable to change the speed of the ship by changing the speed of the generator.

When a steam turbine is used as the prime mover of such a system, the speed of the generator and motors can be varied by simply changing the steam admission to the turbine, the resistance of the propeller balancing the force of the steam and the electrical apparatus establishing a fixed ratio between the turbine speed and that of the propeller. Such a method of speed control would be adequate for handling a ship, were it not for the fact that it is frequently desirable to interrupt and change the arrangement of the electrical connections for reversing and for altering the pole numbers of the primary element of the motors to give different speeds. In the event of such circuit interruptions, the load is removed from the prime mover and it will immediately acquire an excessive speed unless some means is provided for limiting it. In my Letters Patent of the United States, No. 1,137,308, dated April 27, 1915, I have described a governing mechanism for automatically maintaining any approximate speed which may be desired, whether the turbine is loaded or unloaded. This governing mechanism provides means for maintaining any desired turbine speed, whether the generator is loaded or unloaded, and renders available for the ordinary variation of steam admission the same device that is used for the control of the admission valves by the usual governing action.

My present invention contemplates the use of a plurality of electric generators, preferably alternators and preferably two in number, adapted to be electrically connected to a plurality of electric motors. Connections are provided for connecting either, or any, generator to any motor or motors, and the control of the connections is such that when it is desired to employ the energy developed by only one alternator that the other alternator or alternators may be electrically isolated from the system.

Preferably the propeller driving motors are of the induction motor type having pole changing means for producing different pole numbers of the primary element, whereby two or more different speeds may be obtained. In connection with ship propulsion the use of a plurality of generators has a peculiar usefulness since a change in the speed of the ship involves a relatively great change in the power required for propulsion, so that a plurality of generators are not required at the lower speeds and are required at the higher speeds, and so at the lower speeds it is far more economical to run a single generator rather than two.

The motors are preferably of the squirrel cage type. An ordinary squirrel cage motor is adapted to pole changing but not to the insertion of resistance in the secondary circuit and hence would be worthless in a system of ship propulsion, because of the large torque required in reversing. In order to secure the necessary torque of the propeller driving motors for maneuvering operations, I propose to employ a short-circuited secondary winding of the squirrel cage type having an inductively changing effective resistance, that is to say, a winding whose effective resistance is low when the frequency of the secondary current is low, but whose effective resistance is high when the frequency of the secondary current is high, due to the increased reactance of the winding occasioned by the current of higher frequency. The use of a propeller driving motor having a secondary winding of this character is disclosed and claimed in the patent application of Ernest F. W. Alexanderson, filed April 26, 1913, Serial No. 763,696. In the system of electric ship propulsion herein described I propose to employ motors of the double squirrel cage type, such as are disclosed in the Alexanderson patent application, and to provide a primary winding adapted to be connected for two different pole numbers, and hence to give two different speeds with alternating current of one frequency. By way of example, I may mention a particular case where the two motor speeds are in the ratio of 2 to 3, that is, the generators with one motor connection have about the same speed at 21 knots that they have at 14 knots with the other motor connection.

Each generator is so arranged that its excitation can be varied, and this variation I effect not by a field rheostat in the generator circuit but through the action of a small auxiliary direct current generator connected to the shaft of the main exciter for the generator. The small auxiliary generator acts as a booster or lowerer of the voltage in the generator field circuit, depending upon its connection. The objects of varying the strength of the excitation of the generator are, first, that the efficiency with diminished loads may be kept practically constant by lowering the excitation to a suitable degree, and, second, that it is advantageous to use a greatly increased excitation so as to give the motors high torque characteristics in the act of reversal.

I do not here claim the broad idea of employing over-excitation of the generator during the reversing operation of the ship, since this forms the subject matter of certain claims in the Alexanderson application hereinbefore mentioned.

The double squirrel cage motor, like other squirrel cage motors, affords the advantage that the poles of the primary winding can be changed without changing the secondary connections, and is, therefore, conveniently suited to a case where two speed ratios are desired. It could not, however, without some sacrifice of efficiency be given the characteristics required for quick reversal unless it were given a large excess of excitation in the act of reversal. If the motor were so designed that it gave sufficient reversing torque with normal excitation its normal resistance would have to be high and the efficiency under normal conditions would be relatively low.

The circumstances governing the operation of the generator in a system of electric ship propulsion are quite different from most other cases. Since the generator provides current for propelling purposes only, its speed and excitation can be varied at will without interference with any other service. The demand of a ship's propeller on the ship's power plant is substantially constant for any particular speed of the ship. The power required for driving the propellers varies approximately as the cube of the speed. The total maximum available power of the turbines need be only slightly greater than the power required to drive the ship at its maximum speed. Here then is a case of a turbine-driven generator of substantially the same capacity as the motors supplied with electric energy therefrom. The generators supply energy to a single set of translating devices which constitute their only load and which utilize their full total capacity under maximum load conditions. Since the act of bringing the motors and generators near to synchronism, after reversal of the motors, will only occupy a few seconds, it is possible to use in reversal with this particular system of apparatus generator excitation far greater than would normally be practical. Such an excitation as is proposed would normally saturate the generator and cause very high losses, but in the act of reversing the function of this overexcitation is simply to overcome the armature reaction of the generator and thus to sustain the generator's voltage, which would otherwise fall when the large draft of current incident to reversal came upon it. The method which I propose to use for varying the excitation of the generator has a special usefulness in this connection because it is desirable to adopt an arrangement which will make it possible to excite from a constant potential circuit, so that the lighting and power circuits normally used in the ship may, if desired, be employed for such a purpose and also that the unit employed for excitation may at the same time be used to deliver current for other purposes such as the driving of engine room auxiliaries. With such wide variations of voltage as are desired in the control of the generator field, it would be very inconvenient to depend simply upon rheostats, if a constant potential circuit were used.

My present invention contemplates the use of the auxiliary generator to lower the voltage impressed on the main generator field while operating at speeds where diminished excitation is desired and its use as a booster to raise such voltage during the time of reversal when a large excess of excitation is desired.

An important feature of my present invention is the method of and apparatus for reversing the ship. I propose to effect the reversal of the ship in five principal steps, comprising, first, shutting off the steam admission to the turbine; second, deënergizing the field of the generator; third, reversing the motor connections; fourth, energizing the field of the generator; and fifth, admitting steam to the turbine. This cycle of operation for the reversal of the ship is highly advantageous. By cutting off the steam supply the generator and motor or motors are free to pull into substantial synchronism in the minimum space of time. After they have come near to synchronism, the steam can be admitted and the full torque of the turbine will then be available up to the maximum holding power of the motors. Thus after the very short interval required to get the motor and generator together, the full turbine power is available for reversing, whereas ordinary turbine-driven ships use a small and inefficient auxiliary turbine for such purposes.

I have further devised certain controlling arrangements and apparatus by which the different successive operations ahead and astern can be effected in their proper order by moving a single lever or by turning a hand on a dial. This controller is so arranged that a part of its motion makes the desired electrical connections for going ahead or reversing with the desired degrees of excitation, these connections being made through the agency of electrically operated switches, as is done in electric locomotives. Another part of the motion of this controller acts upon the steam admission or governing mechanism of the turbine. One such controller is provided for operation in connection with each generating unit and one or more motors. Its action may be generally described as follows: When the handle or pointer of the controller is shut off, all circuits are open including the exciting circuit of the generator. If the pointer is moved, to the right for example, it first reaches a position in which contacts are made to cause the go-ahead motor switches to close. It next reaches a position where the generator is given excitation. Further movements to the right beyond this position admit steam to the turbine or set the governing mechanism for the steam admission required for the desired speeds. When the steam is thus admitted to the turbine, the generator and motor or motors start up together and operate together with the established speed ratio just as if the turbine were driving the propeller direct. If it is desired to stop, the pointer is moved back. The first effect of this backward movement is to shut off the steam, the second effect is to open the field circuit of the generator, and the third effect is to open the go-ahead switches. If the pointer is in the right hand position, as described, and the ship is going ahead and it is desired to reverse, the procedure is to move the pointer back to its starting or off position and to continue its movement around to the left. The first point reached in its movement to the left establishes the connections for reversal of the motor, and further movement to the left provides for the application to the generator of the over-excitation above described, and movements beyond this point provide for the steam admission as in going-ahead. The most effective way of carrying out this method of reversal is to move the controller until the over-excitation has been applied to the generator, and then to wait until the generator and motor have pulled together before beginning to admit steam. The inertia of the generator will, through a short interval, apply a torque to the reversal of the motor practically as strong as that which would be applied if the generator were held at full speed. This torque will, in a few seconds, pull the generator and motor near to synchronism. This coming together of the generator and motor, that is their coming into synchronism, will be indicated by a fall of current shown by the ammeters, and after this fall of current has occurred, steam can be admitted up to the maximum power of which the turbine is capable.

In the reversal of ships which are operated directly by turbines, small separate turbines are used for reversal. These separate turbines are inferior in torque and economy to the go-ahead turbines and consequently give a diminished reversing power. They are also objectionable since they occupy space, add weight, and introduce large friction losses. By the particular means which I have adopted, a large power is instantaneously available for reversal, and after a very brief period, possibly twenty seconds, the motor and generator have pulled together so that the full power of the turbine is available in the act of reversal.

In the equipment which I have illustrated by way of example in the accompanying drawings a governing mechanism is provided for the turbines of the type disclosed in my hereinbefore mentioned patent application, and the steam admission is varied by simply changing the relation of the governing levers through the agency of the controller. The general system of electric ship propulsion of my present invention is, however, equally applicable where no governing mechanism is used, but where the steam admission is varied in any suitable manner by the movement of the controller.

The novel features which I believe to be patentably characteristic of my present invention are definitely indicated in the claims appended hereto. The arrangement of the apparatus in this system and my novel controlling mechanism therefor together with the operation of the system and the controlling mechanism will be best understood by reference to the following description taken in connection with the accompanying drawings, in which:

Figures 1, 7, 8, 9:
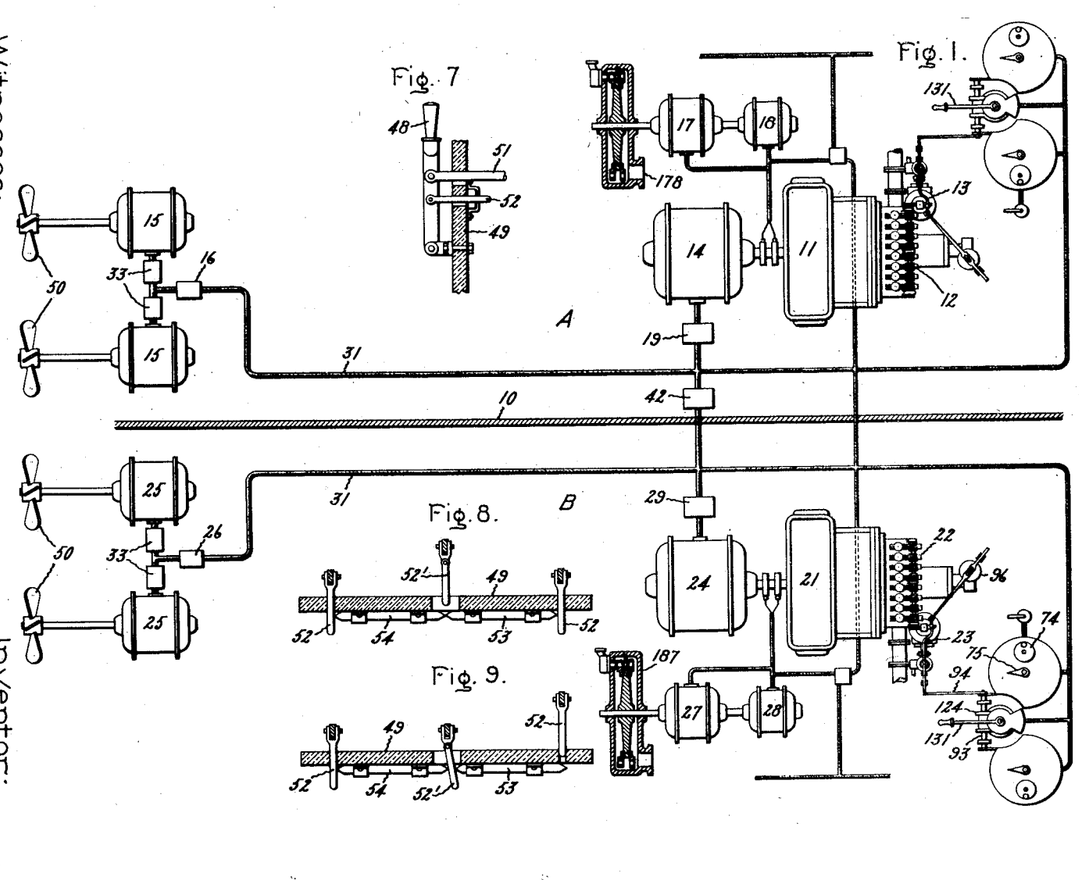
Figure 1 is a diagrammatic view of the apparatus in a system of electric ship propulsion embodying my present invention.
Figs. 7, 8 and 9 are detail views of a mechanical locking device for certain of the main switches of the system.

The system which I have illustrated in the accompanying drawings comprises two duplicate sets of apparatus. I shall herein speak of these as located in separate engine rooms A and B, although it will, of course, be understood that this designation is arbitrary and that the entire apparatus may be located in a single engine room or otherwise distributed as desired to meet existing conditions. In the drawings, I have represented a bulkhead 10 as separating the two engine rooms. The principal apparatus in engine room A comprises an elastic fluid turbine 11, such as a steam turbine, having a compound steam admission valve consisting of a series of admission valves 12. These admission valves are of well known construction and are illustrated and described in detail in my aforementioned patent. A governing mechanism 13 of the type described in my aforementioned patent is operatively related to the admission valves 12, and serves to control the steam admission to the turbine and hence the turbine speed. An alternator 14 is directly connected to the turbine, and is arranged to supply electric energy to one pair of electric motors 15 associated primarily with the apparatus of engine room A, or to a second pair of electric motors 25 associated primarily with the apparatus of engine room B, or to both pairs of motors. A direct current generator or main exciter 17, electrically connected in series with a small auxiliary direct current generator 18, furnishes the excitation for the alternator 14. The auxiliary generator is adapted to act either as a booster or lowerer of the voltage generated by the exciter 17, depending upon the direction of its field magnetization, as will be more fully explained hereinafter. In the drawings, I have shown the two direct current generators 17 and 18 directly coupled together and driven by an independent prime-mover, such as a small turbine 178. It will, of course, be understood that these generators may be separately driven by any suitable means, and I do not wish to be limited to the precise driving arrangement herein illustrated to explain the principle of my invention. Under certain conditions it may be desirable to couple the auxiliary generator direct to the turbine shaft, so that the voltage developed by the auxiliary generator will vary directly as a function of the turbine speed. In this manner an automatic variation of the alternator excitation responsive to changes in the speed of the turbine may be obtained. The generator 17 may be of a larger capacity than required for the excitation of the alternator 14 so that it may be used for delivering current for other uses, such as the driving of engine room auxiliaries. The apparatus in engine room B comprises a steam turbine 21 having a series of admission valves 22, a governing mechanism 23, an alternator 24, an exciter 27, an auxiliary generator 28 and a prime-mover 187 arranged in the same manner as the corresponding apparatus in engine room A. Propellers 50 are connected to the rotors of the motors 15 and 25 in any suitable manner. In Fig. 1 of the drawings I have represented the electrical conductors of the systems inclosed in cables 31 extending between the various pieces of electrical apparatus, while in Fig. 2, I have diagrammatically illustrated the conductors in detail.

The propeller driving motors 15 and 25 are of the induction motor type having a primary winding adapted to be connected to give two different pole numbers. In the accompanying drawing, I have shown by way of example a primary winding of the general type disclosed in the patent to Alexanderson, No. 841,609 dated January 15, 1907, and specifically disclosed in an application for patent of said Alexanderson filed Dec. 17, 1915, Serial No. 67,387. This motor is designed to be operated from a quarter-phase source of electric energy, and the primary winding is so arranged that the motor has eight terminals. I have diagrammatically represented the primary winding by reference character 32 in Fig. 3 of the drawings.

Figures 3, 4, 5, 6:
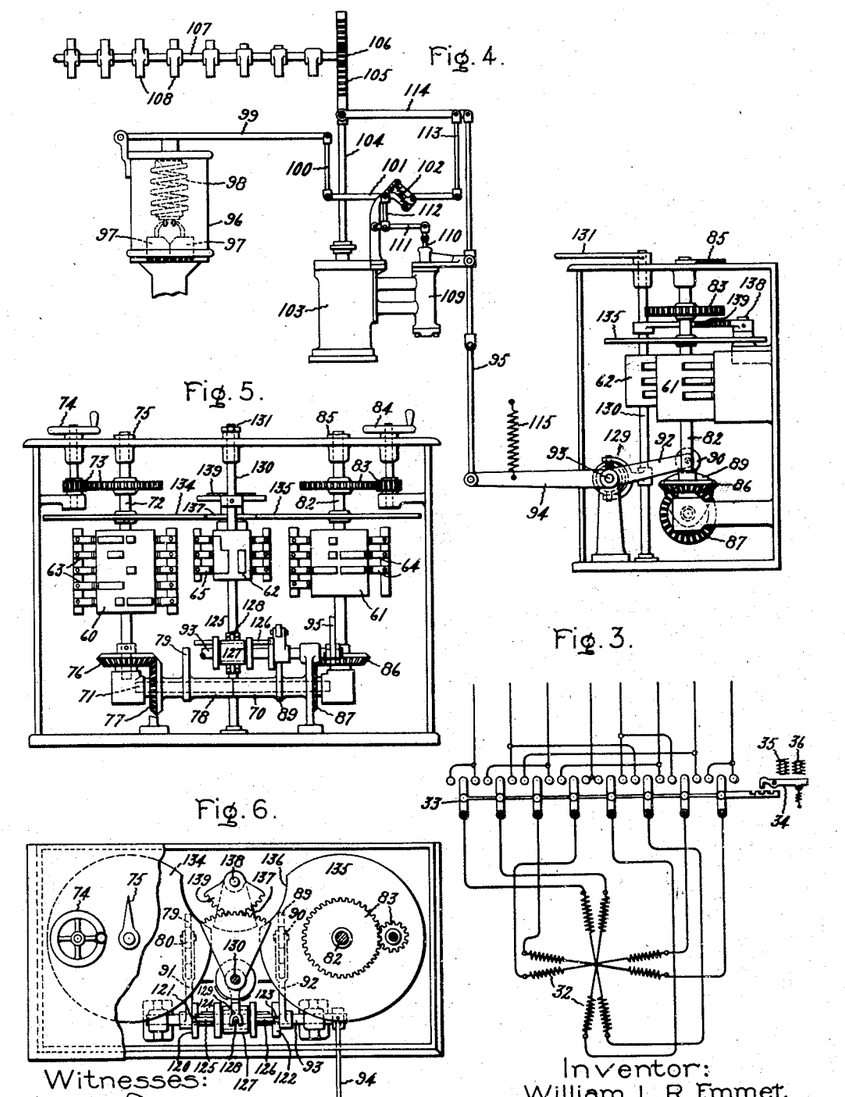
Fig. 3 is a diagrammatic view of the primary winding and pole changing switch of a propeller driving motor employed in the system.
Fig. 4 is a diagrammatic view of the controlling apparatus connected to the governing mechanism of a turbine.
Figs. 5 and 6 are bottom plan and elevation views, respectively, partly in section, of a controller.

A pole changing switch 33 is provided for each motor, and is electrically related to the terminals of the primary winding 32 of the motor, as indicated in Fig. 3. The pole changing switches 33 are preferably hand operated, and are adapted to be locked in any one of their three operative positions by an electromagnetic locking device 34. Each locking device 34 has two magnetizing coils 35 and 36. It will, of course, be obvious that the two motors of each pair of motors may, if desired, be provided with a single pole changing switch, so that the pole numbers of the two motors may be simultaneously changed by the operation of a single switch. Since it is sometimes desirable or necessary to electrically disconnect a particular motor from the system, I have provided a pole changing switch for each motor. When the pole changing switch of any motor is in its off or mid position, as indicated in Fig. 3, that motor will be disconnected from the system. When the pole changing switch occupies its right hand operative position, Fig. 3, the primary winding of the motor will be arranged to give a particular number of poles, and when this switch occupies its left hand operative position, Fig. 3, the primary winding will be arranged to give a different particular number of poles. The particular pole numbers which the primary winding is adapted to give will be determined by the particular desired speed ratios of turbine-speed to propeller-speed. At the present time it appears that two speed ratios are sufficient in the vast majority of classes of ship propulsion, but it will, of course, be understood that a greater number of speed ratios may be used if necessary or desired. Merely by way of example, I may mention a particular instance in which the primary winding is arranged to give 24 and 36 poles, with a normal generator frequency of 30 cycles. This will result in a ship's speed of 21 and 14 knots, respectively. In accordance with the method of speed control employed in my present system, the generator frequency can be varied by adjusting the steam admission to the turbine, whereby the speed of the propeller driving motors will be varied in the well understood manner. As heretofore stated, I prefer to employ a secondary winding of the double squirrel cage type, such as disclosed in the aforementioned Alexanderson patent application, Serial No. 763,696, but it will, of course, be understood that I may also use a secondary winding of the same type as the primary winding suitably connected to a rheostat, as described in the Alexanderson patent application Serial No. 67,387.

The propeller driving motors 15 are provided with a solenoid operated double throw oil switch 16. In the drawings, I have shown the switch 16 biased by means of springs 16' to an off or mid position, this being the position the switch occupies in Fig. 2 of the drawings. It will, of course, be understood that this switch is diagrammatically represented in the drawings, and that the same may be of any suitable design of double throw solenoid operated oil switch having a biased off position. I have represented the switch as provided with energizing coils 38 and 39. When the coil 38 is energized the switch is thrown to its right hand position, Fig. 2, and the motors 15 are connected for ahead operation. When the coil 39 is energized the switch is thrown to its astern position. The motors 25 are provided with a similar switch 26 having energizing coils 40 and 41 for moving the switch to its "ahead" and "astern" positions, respectively. The switch 16 is electrically associated with bus bars 20, while the switch 26 is electrically associated with bus bars 30. The alternator 14 is adapted to be connected to the bus bars 20 by a hand operated switch 19, while the alternator 24 is adapted to be connected to the bus bars 30 by a hand operated switch 29. A third hand operated switch 42 is adapted to connect the two bus bars 20 and 30 together. An electromagnetic locking device 43 having energizing coils 44 and 45 is associated with each of the switches 19, 29, and 42. These locking devices are adapted to lock the switches in either one of their operative positions.

The energizing coils 35 and 44 of the locking devices for the hand operated switches 33, 19, 29 and 42 are connected in an electric circuit 46 across the field of the alternator 24. Whenever the field of the alternator 24 is energized, the coils 35 and 44 will be energized, and will operate to electromagnetically lock the switches 33, 19, 29 and 42 in the positions to which they have been manually thrown. The coils 36 and 45 are similarly connected in a circuit 47 across the terminals of the field of the alternator 14, and will be energized whenever this alternator field is energized. It will thus be seen that the switches 33, 19, 29 and 42, are automatically locked when either or when both of the two alternator fields are energized.

Figure 2:
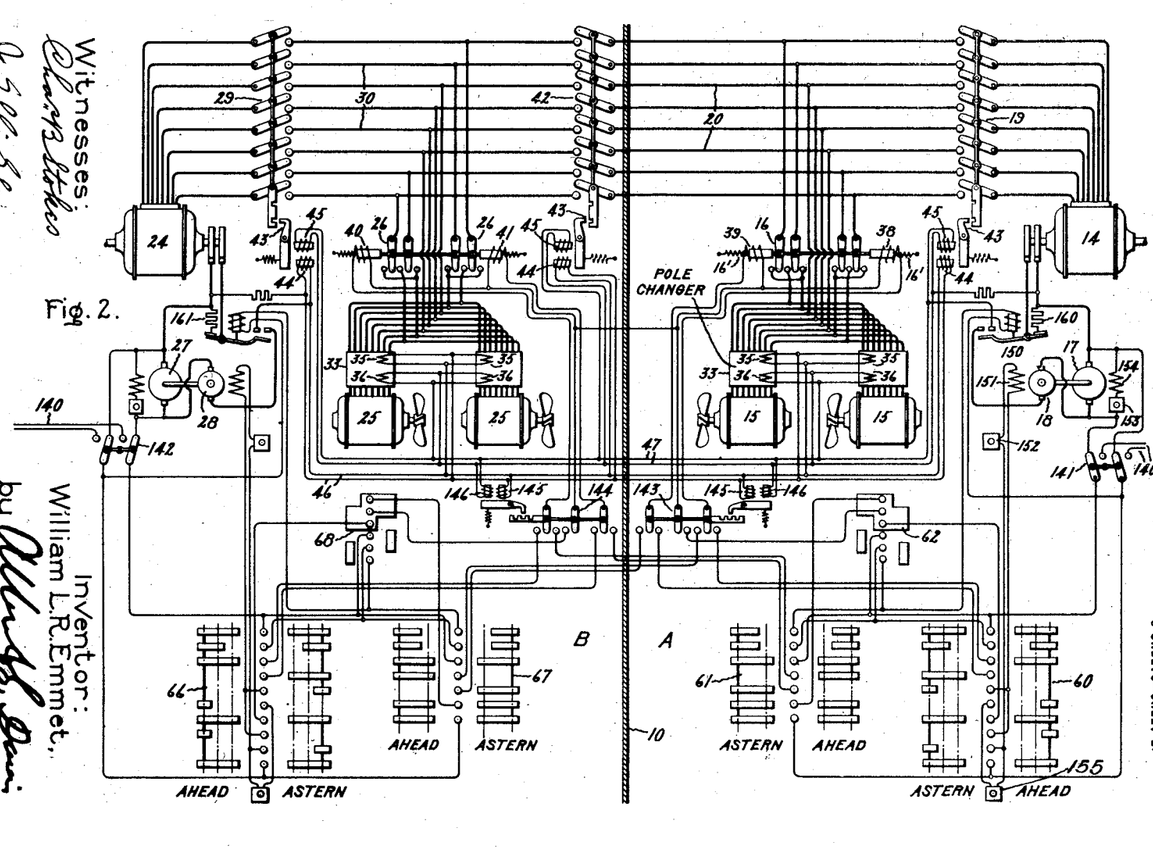
Fig. 2 is a diagrammatic view of the electrical controlling apparatus in such a system.

The switches 19, 29 and 42 are mechanically interlocked so that only two of these switches can be closed at the same time, although all three may be simultaneously opened, as indicated in Fig. 2. In Figs. 7, 8 and 9 of the drawings, I have represented, merely by way of example, a mechanical interlock, but it will, of course, be understood that any suitable interlocking mechanism may be employed which will enable any two of these three switches to be closed at the same time, while preventing the closing of all three switches at the same time. Each of the switches 19, 29 and 42 has an operating handle 48 pivoted to a common switch board 49 and connected to a switch-operating rod 51 extending through a hole in the switch board. Each switch handle has a pin 52 secured thereto and extending through the switch board and pivoted for movement through a small angle in a vertical plane. The pin 52′ of the centrally positioned switch handle is, further, pivoted for movement through a small angle in a horizontal plane, as will be seen by reference to Figs. 8 and 9. Behind the switch board are two bars 53 and 54 mounted for a limited reciprocating or to and fro movement. The ends of each bar are beveled, and these beveled ends are operatively related to the pins 52, as will be understood by reference to Figs. 8 and 9. When the two end switches are closed the inner ends of the bars 53 and 54 are moved together so that the middle switch cannot be closed, as indicated in Fig. 8. When either end switch and the middle switch are closed, the bar 53 or 54, as the case may be, is moved toward the right or left, respectively, thereby preventing the closing of the other end switch, as will be understood by reference to Fig. 9 of the drawings. It will be seen, however, that all three or any two of the switches 19, 29 and 42 may be opened at the same time if desired.

A controller is associated with the apparatus of each engine room, and is so arranged that a part of its movement makes the desired electrical connections for going-ahead or reversing with the desired degrees of excitation, while another part of its movement acts upon the governing mechanism to adjust the steam admission of the turbine. The electrical part of each controller comprises two main controller units, which may be, for example, of the usual drum type, and an independently operable auxiliary controller unit. Thus the controller of engine room A comprises two main controller drums 60 and 61 and an auxiliary controller drum 62 with coöperating contact fingers 63, 64 and 65, respectively, of the usual construction well known in electric locomotive design. The controller of engine room B similarly comprises two main controller drums 66 and 67, an auxiliary controller drum 68, and coöperating contact fingers. The mechanical features of construction of the controller are illustrated in Figs. 4, 5 and 6 of the drawings. It will, of course, be understood that I do not desire to be limited to the specific construction of controller herein illustrated and described, and it will be obvious to those skilled in the art that the principle of my invention may be carried out with controllers of various types and designs.

The controller drum 60 is secured to a shaft 72. This shaft is adapted to be turned through the agency of a pair of intermeshing gears 73 and a manually operable handle or wheel 74. A dial 75 on the shaft 72 indicates the movement of the controller. A bevel gear 76 is secured to the shaft 72 and meshes with a bevel gear 77 secured to a sleeve 78. The controller drum 61 is similarly secured to a shaft 82 adapted to be turned by a handle 84 and intermeshing gears 83, and having an indicating dial 85 and bevel gear 86. The gear 86 meshes with a bevel gear 87 secured to a sleeve 70. The sleeves 78 and 70 are loosely mounted on a common shaft 71. Two cams 79 and 89 are secured to the sleeves 78 and 70 respectively. The operative surface of each of the cams 79 and 89 is circular or concentric over a certain distance and heart-shaped or eccentric over its remaining distance, as will be clearly seen in Figs. 4 and 5.

Cam-followers 80 and 90 are adapted to bear on the operative surfaces of the cams 79 and 89 respectively. The cam-followers 80 and 90 are secured at one end of arms 91 and 92, respectively, and these arms are each loosely mounted at their other ends on a shaft 93. An arm 94 is rigidly secured at one end to the shaft 93 and at its other end to the actuating rod 95 of the governing mechanism of the turbine. The governing mechanism which I have shown in connection with my present system is of the type disclosed in my aforementioned patent, and inasmuch as this mechanism is described in detail therein it will here be merely necessary to indicate the essential characteristics of the construction of such mechanism.

A governor or other speed responsive device 96 is operatively connected to the shaft of the turbine. The governor shown in the drawings is of the centrifugal type comprising weights 97, a spring 98 and a lever 99 fulcrumed at one end to the casing of the governor. A link 100 operatively connects the other end of the lever 99 to one end of a floating lever 101. The lever 101 is composed of two similar members resiliently held together by a spring 102. A fluid pressure motor 103 is mounted on the turbine base or casing and is provided with a piston and a coöperating piston rod 104, the latter being directly connected to a rack 105 meshing with a pinion 106 on a cam shaft 107 of the series of steam admission valves 12. The valves 12 and operating mechanism are of a well known form, and for the purposes of my present invention it is only necessary to say that the shaft 107 is provided with as many cams 108 as there are admission valves, it being desirable to provide a plurality of these valves and to have the cams arranged to open them in successive order and to similarly close them. A pilot valve 109 is associated with the motor 103 and has its piston rod 110 operatively connected to the floating lever 101 by a lever 111 and a link 112. The floating lever 101 is pivotally connected to the lower end of a link 113, the upper end of the link being pivoted a short distance from the outer end of an arm 114. The arm 114 is pivoted at its outer end to the actuating rod 95 and at its inner end to the piston rod 104. The arm 114, the link 113 and the floating lever 101 constitute a follow-up device of the usual type for the pilot valve. Movement of the actuating rod 95 upwardly operates to adjust the governing mechanism to open the steam admission valves of the turbine. A spring 115 is connected to the arm 94 and tends to force the actuating rod in a direction to effect the opening of the valves 12.

The speed governing mechanism, which comprises the controlling valves for the admission of steam to the turbine, the hydraulic mechanism for actuating the valves and the centrifugal governor, is adapted to approximately maintain any speed in the range of normal operating speeds of navigation. The governing mechanism, therefore, directly controls the speed of the turbine. Different speeds are obtained by changing the fulcrum of the governor by movement of the actuating rod 95. The governing mechanism is designed to operate through a wide range of speeds, from the lowest to the highest operative speed at which it is desired to drive the ship for a particular speed ratio of the turbine and propeller. The governing mechanism is so constructed that it will maintain the speed of the turbine constant, within the usual narrow limits, at any speed for which it is adjusted within the wide range of speed limits.

A plate 120 having a hole 121 therein is secured to the end of the arm 91 mounted on the shaft 93. A similar plate 122 having a hole 123 is secured to the arm 92. A sleeve 124 is keyed to the shaft 93 and is mounted for longitudinal movement along the shaft. The sleeve has a pin 125 at one end adapted to engage in the hole 121 and a pin 126 at the other end adapted to engage in the hole 123. A collar 127 is loosely mounted on the sleeve 124 between two end flanges on the latter, and has a pair of diametrically opposite pins 128 engaging the forked ends of a yoke 129. The yoke 129 is secured to a shaft 130 having an operating handle 131. Rotary movement of the shaft 130 moves the sleeve 124 along the shaft 93. When the sleeve 124 occupies its central or normal position on the shaft 93, the pins 125 and 126 extend a short distance into the holes 121 and 123, respectively. The two arms 91 and 92 are thus operatively secured to the shaft 93. Movement of the sleeve 124 toward the left moves the pin 126 out of the hole 123 and operatively disengages the arm 92 from the shaft 93. Movement of the sleeve 124 toward the right similarly disengages the operative connection of the arm 91 with the shaft 93.

A locking disk 134 is secured to the controller shaft 72, while a second similar locking disk 135 is secured to the other controller shaft 82. Each of the locking disks has an arcual indentation 136. A locking plate 137 of sector-like configuration with an arcual outer periphery is secured to a shaft 138. A pair of intermeshing sector-shaped gears 139 operatively connects the shaft 138 to the shaft 130. Rotary movement of the shaft 130 in either direction from its central position moves the plate 137 into one or the other of the indentations of the locking disks, provided, of course, that the controller shafts 72 and 82 are each in their respective initial or normal position, as indicated in Fig. 6.

It will be observed that the auxiliary controller drum 62 is secured to the shaft 130. This controller has three operative positions, a mid position, in which the two arms 91 and 92 are operatively connected to the shaft 93 and the disks 134 and 135 unlocked, a left-hand position, as viewed in Fig. 6, in which the arm 91 is operatively connected to the shaft 93 and the disk 135 is locked, and a right-hand position, Fig. 6, in which the arm 92 is operatively connected to the shaft 93 and the disk 134 is locked. The controller 62 is moved by means of the handle 131.

The controller of engine room A is adapted to control the operation of either pair of motors individually or collectively with current supplied from the alternator 14, while the controller of engine room B is similarly adapted to control the operation of either pair of motors. The controlling apparatus is so arranged that when the operator of either engine room is controlling either or both pairs of motors, the operator of the other engine room cannot operate his controller with respect to the motors in the control of the first operator. The alternator and turbine of each engine room can only be controlled by the controller in their own engine room. It will also be seen that the apparatus of each engine room can be independently operated without regard to the apparatus of the other engine room.

The electrical design and construction of the controllers will be understood by reference to Fig. 2 of the drawings. The solenoid coils of the various switches and locking devices can be energized from the terminals of either alternator field or from the usual constant potential direct current lighting or power circuit 140 of the ship. Hand operated switches 141 and 142 serve to suitably connect these various sources of current to the controllers. Hand operated double throw switches 143 and 144 are associated with engine rooms A and B, respectively, and are adapted to electrically connect the controllers to the reversing switches 16 and 26. The switches 143 and 144 are provided with electromagnetic locking devices having energizing coils 145 and 146 electrically connected to the electric circuits 46 and 47, respectively. When it is desired to individually operate each pair of motors from its own turbo-alternator the switch 143 will be thrown toward the right and the switch 144 will be thrown toward the left. If it is desired to operate both pairs of motors solely by the controller of the engine room A, both switches 143 and 144 will be thrown toward the right, while if both pairs of motors are to be operated solely by the controller of engine room B, both switches will be thrown toward the left. It will thus be evident that all four motors cannot be operated from the same engine room until the switches 143 and 144 have been manually thrown to their proper positions. Furthermore, an operator in either engine room can isolate the pair of motors associated with that engine room from the controller of the other engine room, and can isolate the motors of the other engine room from the controller of his own engine room.

The controller drums 60, 61, 62, 66, 67 and 68 are diagrammatically developed in the conventional manner in Fig. 2 of the drawings, and the mechanical construction and electrical operation of these controllers will be readily understood by those skilled in the art. Since the controller drums 60, 61 and 62 are in every respect similar to the drums 66, 67 and 68, respectively, it will only be necessary to describe the controller of one engine room, and for this purpose I will briefly describe the electrical controlling apparatus of engine room A. The auxiliary controller drum 62 has three operative positions. When in its center or neutral position it electrically interconnects the two controller drums 60 and 61. When moved to its right hand position, as viewed in Fig. 2, the auxiliary controller operates to electrically disconnect the controller drum 60 from the controller drum 61, and at the same time the plate 137 is moved into the indentation of the locking disk 134, so that the controller drum 60 is mechanically locked and cannot be moved while the auxiliary controller drum occupies this position. The controller 61 is under this condition available to operate only the motors 25 from the energy supplied by the alternator 14. When the auxiliary controller 62 is moved to its left-hand position, Fig. 2, the controller 61 is electrically disconnected from the controller 60 and is mechanically locked by the engagement of the plate 137 in the indentation of the locking disk 135. Under this condition the controller 60 is available to operate only the motors 15 from energy supplied by the alternator 14. It will, of course, be understood that when the controller drum 60 is locked and the motors 25 are to be controlled by the drum 61, the switch 144 must be thrown toward the right, and that when the drum 61 is locked and the motors 15 are to be controlled by the drum 60 the switch 143 must be thrown toward the right.

For the purposes of further explanation I will assume that the auxiliary controller 62 occupies its left-hand position as viewed in Fig. 2, thereby electrically disconnecting the controller 61 from the controller 60 and mechanically locking the controller 61. The switch 143 will be manually thrown toward the right and the switch 19 will be closed. Assume the ship to be at standstill and that the controller 60 be turned in the direction for ahead operation, that is toward the left in Fig. 2. The first operative contact position of the controller will energize the coil 38, thereby moving the switch 16 into its ahead position. The second operative contact position of the controller 60 will energize the magnetizing coil of the solenoid operated field switch 150, thereby connecting the exciter 17 and auxiliary generator 18 in series with the field circuit of the alternator 14. The third and last operative contact position of the controller 60 will close the field circuit of the auxiliary direct current generator 18. This field circuit includes the field winding 151, and rheostats 152 and 155. The rheostat 155 is intended to be of a permanent constant ohmic value, while the resistance of the rheostat 152 may be varied to suitably adjust the energizing current in the field circuit of the generator 18. The current flow in this field circuit when the controller 60 occupies the last mentioned contact position is of such a direction that the terminal voltage of the auxiliary generator 18 is subtracted from the terminal voltage of the exciter 17, the auxiliary generator under such condition acting as a lowerer of the exciter voltage. The voltage impressed on the field of the alternator 14 will thus be the terminal voltage of the exciter 17 minus the terminal voltage of the auxiliary generator 18. The field circuit of the auxiliary generator may be energized from the terminals of the exciter 17 or from the mains 140. The exciter 17 is represented in the drawings as having a self-excited shunt field 154 with a rheostat 153 included in the circuit thereof.

Movement of the controller 60, as described in the preceding paragraph, makes the necessary electrical go-ahead connections for the motors 15 and the alternator 14. Further movement of the controller 60 toward the left opens the steam admission valves 12 through the agency of the governing mechanism. During the movement of the controller 60 for making the necessary electrical connections either ahead or astern, the cam follower 80 will ride on the circular or concentric section of the cam 79. The arm 91 is, accordingly, not moved, and the steam admission valves 12 remain closed. When the auxiliary controller 62 was initially moved to its left-hand position the sleeve 124 was thereby longitudinally moved along the shaft 93 until the pin 126 was entirely out of the hole 123. Under this condition the shaft 93 can only be turned by the arm 91. As the controller 60 moves farther toward the left, Fig. 2, after making the necessary electrical connections, the cam 79 will be turned, through the action of the intermeshing bevel gears 76 and 77, until the follower 80 rides upon the eccentric portion of the cam. The spring 115 maintains the follower 80 in engagement with the cam surface, and as the controller 60 is turned more and more the outer end of the arm 94 is raised and operates the actuating rod 95 to adjust the governing mechanism to admit more and more steam to the turbine.

With the controlling apparatus in the position last described, I will assume that it is desired to reverse the ship. The controller 60 is moved backwardly, that is toward the right as viewed in Fig. 2. The cam follower 80 rides along the eccentric portion of the cam 79 and operates to force the outer end of the arm 94 downwardly until the follower engages the circular or concentric portion of the cam. The steam admission valves 12 are now closed. Further movement of the controller 60 successively opens the field circuit of the generator 18, deënergizes the solenoid operated switch 150, thereby opening the field circuit of the alternator 14, and deënergizes the coil 38 of the switch 16, so that the switch is free to move to its off position. The controller 60 is now in its off or neutral position. As the controller 60 is moved toward the right, Fig. 2, the coil 39 of the switch 16 is first energized, thereby making the reversing connection for the motors 15. The switch 150 is next closed and then the field circuit of the auxiliary generator 18 is closed. It will be noted, however, that the direction of flow of current in this field circuit is now opposite to what it was for the go-ahead connection. In other words the voltage of the generator 18 is now added to that of the exciter 17, and hence the voltage impressed on the alternator field is the sum of the terminal voltages of these two direct current generators. This furnishes the over-excitation for the alternator necessary for reversing, as hereinbefore described. Continued movement of the controller 60 in the same direction effects the admission of steam to the turbine, as will be readily understood. Preferably, steam is not admitted to the turbine until the ammeters indicate that the motors and alternator have pulled into substantial synchronism, as heretofore explained.

Under certain conditions it may be desirable to operate the motors 25 with energy supplied by the alternator 14. The switches 19 and 42 are closed and the motors are controlled by the controller 61. The auxiliary controller 62 is moved toward the right, Fig. 2, thereby mechanically locking the controller 60, and electrically disconnecting the same from the controller 61. The first operative contact position of the controller 61, either ahead or astern as the case may be, energizes the go-ahead coil 40 or the reverse coil 41, respectively, of the switch 26. The next operative position of this controller in either direction effects the closure of the switch 150, thereby energizing the alternator field. It will be noted that the field of the auxiliary generator 18 is not energized, and hence that the voltage impressed on the field of the alternator 14 is substantially the terminal voltage of the exciter. The operation of the motors 25 by the controller 61 will at most be only of infrequent occurrence, and the circumstances under which such operation will be desirable or necessary will not ordinarily require a lowering or boosting of the exciter voltage. If, however, it is desired that the exciter voltage be modified by the voltage of the auxiliary generator, as heretofore described, the controller 61 may be designed in a manner similar to the controller 60, as will be well understood by those skilled in the art. I have herein illustrated the simpler construction of controller because in the ordinary classes of ship propulsion it will not be necessary to so modify the voltage of the exciter for this particular arrangement of the apparatus.

Both pairs of motors 15 and 25 may be operated together from the controller of engine room A with energy supplied by alternator 14. For such operation the switches 19 and 42 are closed and the switches 143 and 144 are thrown to their right hand positions. The auxiliary controller 62 occupies its neutral or central position, so that the controllers 61 and 60 are each unlocked and free to be turned by their operating handles 74 and 84. The electrical interconnections of the controllers 60 and 61 are such that the two controllers must occupy corresponding positions, or have passed through such positions, before the particular desired electrical connection is made. For example, movement of either controller in either direction to its first operative contact position does not make the necessary electrical connection corresponding to that position, and it is not until the other controller is moved to its first operative contact position that this connection is made. It will be observed that corresponding movement of the two controllers in the same direction effects the movement of the switches 16 and 24 to their ahead or astern position, as the case may be, closes the field switch 150, and energizes the field of the auxiliary generator 18, negatively or positively depending upon whether the controllers are being moved for ahead or astern operation, respectively. Continued movement of the controllers adjusts the governing mechanism of the turbine. It will be observed, however, that with the auxiliary controller 62 in its neutral or mid position the sleeve 124 is operatively connected to each arm 91 and 92. The shaft 93 will, therefore, only be turned to the extent permitted by that controller which has been moved the least amount from its neutral or off position. Both controllers must thus be moved at least a definite amount before the steam admission valves are opened to the extent corresponding to such definite controller movement, although it will be evident that one controller may be moved considerably more than this amount without affecting the governing mechanism.

A discharge resistance 160 is adapted to be connected across the field terminals of the alternator 14 when the field circuit is opened. The switch 150 effects this result, as will be apparent from Fig. 2 of the drawings. The resistance 160 prevents the production of a dangerous current when the alternator field collapses upon the opening of the switch 150. A discharge resistance 161 is similarly associated with the field circuit of the alternator 24.

The magnetizing coils of the hand operated switches of the system are energized whenever the field of either alternator is excited, and the switches are thereby locked in the position to which they have been manually thrown. It will thus be apparent that none of the hand operated switches can be operated while either alternator is excited, and hence the switches will only be operated when the system is electically dead.

While I have described in detail in the preceding paragraphs the controlling apparatus of engine room A, it will, of course, be understood that the controlling apparatus of engine room B is identical in construction and that its operation is in every respect analogous to that of engine room A. The operation of my novel and improved system of electric ship propulsion as a whole and the advantages of the particular features of novelty therein contained will be readily understood by those skilled in the art from the foregoing description.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In a system of electric ship propulsion, a propeller driving electric motor, an electric generator, an elastic fluid turbine, and a controller adapted to successively connect the motor to the generator for astern operation, effect the energization of the generator with a predetermined degree of over-excitation and control the admission of elastic fluid to the turbine.

2. In a system of electric ship propulsion, a propeller driving electric motor, an electric generator, an elastic fluid turbine, and a controller adapted when moved in one direction from its off position to successively connect the motor to the generator for ahead operation, effect the energization of the alternator field and control the admission of elastic fluid to said turbine and when moved in the other direction from its off position to successively connect the motor to the generator for astern operation, effect the energization of the alternator field and control the admission of elastic fluid to said turbine.

3. In a system of electric ship propulsion including a propeller driving electric motor, an electric generator, and an elastic fluid turbine, the method of reversing which comprises shutting off the admission of elastic fluid to the turbine, deënergizing the generator field, reversing the motor connections, energizing the generator field, and admitting elastic fluid to the turbine.

4. In a system of electric ship propulsion including a propeller-driving electric motor, an electric generator, and an elastic fluid turbine, the method of reversing the direction of motion of the ship which comprises the successive steps of shutting off the admission of elastic fluid to the turbine and deenergizing the generator field, reversing the motor connections, energizing the generator field, and admitting elastic fluid to the turbine when the generator and motor have pulled substantially into synchronism.

5. In a system of electric ship propulsion including a propeller-driving electric motor, an electric generator, and an elastic fluid turbine, the method of reversing the direction of motion of the ship which comprises the successive steps of shutting off the admission of elastic fluid to the turbine, deenergizing the generator field, reversing the motor connections, energizing the generator field with a predetermined degree of over-excitation, and admitting elastic fluid to the turbine when the generator and motor have pulled substantially into synchronism.

6. In a system of electric ship propulsion including a propeller driving electric motor and an electric generator, and an elastic fluid turbine, the method of operating the ship in the reverse direction which comprises the successive steps of energizing the generator field with a predetermined degree of over-excitation, and admitting elastic fluid to the turbine.

7. In a system of electric ship propulsion, two propeller driving electric motor units, an electric generator, an elastic fluid turbine, and a controller for controlling the operation of said motors either individually or collectively with electric energy supplied by said generator.

8. In a system of electric ship propulsion, two propeller driving electric motor units, an electric generator, an elastic fluid turbine, and a controller adapted to control the operation of said two motor units together or the operation of one motor unit alone and further adapted to control the admission of elastic fluid to said turbine.

9. In a system of electric ship propulsion, two propeller driving electric motor units, an electric generator, an elastic fluid turbine, a controller comprising two controller units, means associated with said controller for controlling with said two controller units the simultaneous operation of said two motor units, and means associated with said controller for controlling with one controller unit the individual operation of one motor unit.

10. In a system of electric ship propulsion, two propeller driving electric motor units, an electric generator, an elastic fluid turbine, a controller comprising two controller units adapted to control the electrical connections of the system and the admission of elastic fluid to said turbine, and means associated with said controller whereby said two controller units may be coöperatively operated to control the simultaneous operation of both motor units and whereby one controller unit may be independently operated to control the operation of a single motor unit.

11. In a system of electric ship propulsion, two propeller driving electric motor units, an electric generator, an elastic fluid turbine, a controller adapted to control the electrical connections of the system and the admission of elastic fluid to said turbine, and means associated with said controller whereby the controller may be employed to simultaneously control both motor units or to individually control one motor unit.

12. In a system of electric ship propulsion, two propeller driving electric motor units, an electric generator, an elastic fluid turbine, a controller comprising two controller units adapted to control the electrical connections of the system and the admission of elastic fluid to said turbine, an auxiliary controller, and means operatively associated with said auxiliary controller whereby both motor units may be simultaneously controlled by the coöperative action of said two controller units and whereby one controller unit may be independently employed to control one motor unit.

13. In a system of electric ship propulsion, a propeller driving electric motor, an electric generator, an elastic fluid turbine, a controller comprising two controller units, each of said controller units being adapted through a part of its movement to control the electrical connections of the system and through another part of its movement to control the admission of elastic fluid to said turbine, and means associated with said controller whereby a coöperative action of said two controller units may be required for controlling the electrical connections of said motor and the admission of elastic fluid to said turbine.

14. In a system of electric ship propulsion, two propeller driving electric motor units, an electric generator, an elastic fluid turbine, a controller comprising two controller units, and means for locking either of said controller units whereby the other controller unit may be independently employed to control the electrical connections of one or the other of said motor units and the admission of elastic fluid to said turbine.

15. In a system of electric ship propulsion, a propeller driving electric motor, an electric generator, a main source of excitation for said generator, and an auxiliary source of excitation adapted to be connected in series with said main source of excitation to effect an over-excitation of said generator during reversal of the ship.

16. In a system of electric ship propulsion, a propeller driving electric motor, an electric generator, a main source of excitation for said generator, and an auxiliary source of excitation adapted to be connected in series relation with said main source of excitation as a lowerer of the voltage of said main source under normal ahead operation of the ship and as a booster of the voltage of said main source during reversal of the ship.

17. In a system of electric ship propulsion, a propeller driving electric motor, an electric generator, a main source of excitation for said generator, and an auxiliary source of electromotive force adapted to boost the voltage employed for the excitation of said generator during reversal of the ship.

18. In a system of electric ship propulsion, a propeller driving electric motor, a turbo-generator, a direct current exciter for said turbo-generator, an auxiliary direct current generator, and means for connecting said exciter and said auxiliary generator in series relation with their voltages in opposition under normal ahead operation of the ship and with their voltages in conjunction during reversal of the ship.

19. In a system of electric ship propulsion, a propeller driving electric motor, a turbo-generator, a direct current exciter for said turbo-generator, an auxiliary direct current generator included in series relation with said exciter, and means for reversing the direction of magnetization of the field of said auxiliary generator whereby the voltage of the auxiliary generator may act as a lowerer or as a booster of the voltage of the exciter for the excitation of said turbo-generator.

20. In a system of electric ship propulsion, a propeller driving electric motor, a turbo-generator, a direct current exciter for said turbo-generator, an auxiliary direct current generator connected in series relation with said exciter in the field circuit of said turbo-generator, and a controller for closing the field circuit of said turbo-generator and for energizing the field of said auxiliary generator in either direction.

21. In a system of electric ship propulsion, a propeller driving electric motor, a turbo-generator, a direct current exciter for said turbo-generator, an auxiliary direct current generator connected in series relation with said exciter in the field circuit of said turbo-generator, and a controller adapted when moved for ahead operation to close the field circuit of said turbo-generator and to energize the field of said auxiliary generator so that its terminal voltage acts in opposition to the exciter voltage and when moved for astern operation to energize the field of said auxiliary generator so that its terminal voltage acts in conjunction with the exciter voltage.

22. In a system of electric ship propulsion, a propeller driving electric motor, a turbo-generator, a direct current exciter for said turbo-generator, an auxiliary direct current generator connected in series relation with said exciter in the field circuit of said turbo-generator, and a controller adapted to successively connect the motor to the turbo-generator, close the field circuit of said turbo-generator, effect the energization of the field of said auxiliary generator and control the admission of elastic fluid to the turbine.

23. In a system of electric ship propulsion, a propeller driving electric motor, an elastic fluid turbo-generator, a direct current exciter for said turbo-generator, an auxiliary direct current generator connected in series relation with said exciter in the field circuit of said turbo-generator, and a controller adapted to successively connect the motor to the turbo-generator for astern operation, close the field circuit of said turbo-generator and effect the energization of the field of said auxiliary generator in such a direction that the terminal voltage of the auxiliary generator acts in conjunction with the voltage of said exciter.

24. In a system of electric ship propulsion, a propeller driving electric motor, a turbo-generator, a direct current exciter for said turbo-generator, an auxiliary direct current generator connected in series relation with said exciter in the field circuit of said turbo-generator, and a controller adapted when moved in one direction from its off-position to successively connect the motor to the turbo-generator for ahead operation, close the field circuit of said turbo-alternator and effect the energization of the field of said auxiliary generator in such a direction that the terminal voltage of the auxiliary generator acts in opposition to the voltage of said exciter and when moved in the other direction from its off-position to successively connect the motor to the turbo-generator for astern operation, close the field circuit of said turbo-generator and effect the energization of the field of said auxiliary generator in such a direction that the terminal voltage of the auxiliary generator acts in conjunction with the voltage of said exciter.

25. In a system of electric ship propulsion, a plurality of propeller driving electric motors, an electric generator, an elastic fluid turbine, means for adjusting the admission of elastic fluid to said turbine, a controller comprising two controller units and an auxiliary controller adapted to operatively connect either or both of said controller units to the elastic fluid adjusting means.

26. In a system of electric ship propulsion, a plurality of propeller driving electric motors, an electric generator, an elastic fluid turbine, means for adjusting the admission of elastic fluid to said turbine, a controller comprising two controller units, and an auxiliary controller having three operative positions and adapted when in one position to operatively connect both of said controller units to said elastic fluid adjusting means and when in one or the other of its other positions to operatively connect one or the other of said controller units to the elastic fluid adjusting means.

27. In a system of electric ship propulsion, a plurality of propeller driving electric motors, an electric generator, an elastic fluid turbine, means for adjusting the admission of elastic fluid to said turbine, a controller comprising two controller units, a cam operatively connected to each controller unit, a cam-follower for each cam, means for operatively connecting either or both cam-followers to said elastic fluid adjusting means, and means operatively related to each of said controller units for controlling the electrical connections of the system, each of said cams being so designed that its coöperating cam-follower has no effect on the elastic fluid adjusting means until after the desired electrical connections of the system have been made.

28. In a system of electric ship propulsion, two motors or groups of motors driving propellers on opposite sides of a ship, two generating units, a controller group for each generating unit arranged to operate the motors or groups of motors together or separately in either direction from one generating unit, and means whereby the connection of one controller group to the motor or group of motors on the opposite side of the ship prevents the operation of the other controller group.

29. In a system of electric ship propulsion, two motors or groups of motors driving propellers on opposite sides of a ship, a generating unit on each side of said ship, and means whereby the motor or group of motors on one side cannot be connected to the generating unit on the other side until they have first been disconnected from the generating unit on that side of the ship.

30. In a system of electric ship propulsion, a propeller driving electric motor, an electric generator, a prime mover for said generator, motor operating switches for operatively connecting said generator to said motor and means whereby the field circuit of the generator is opened and the power is shut off from the prime mover in advance of the opening of said motor operating switches by the mechanism normally used in operating said switches.

31. In a system of electric ship propulsion, two propeller driving electric motors or groups of motors, a single electric generator adapted to be operatively connected to both motors or groups of motors, a prime mover for said generator, two main controller units, one for each motor or group of motors, and an auxiliary controller unit having three operative positions, one position completing circuits such that both controller units control their respective motors and establishing conditions by which the movement of either controller unit can influence the admission of power to said prime mover, a second position in which one controller unit is rendered inoperative with respect to its corresponding motor and is disconnected from the control of the prime mover, and a third position in which the other controller unit is rendered inoperative with respect to its corresponding motor and is disconnected from the control of the prime mover.

In witness whereof, I have hereunto set my hand this 31st day of December, 1914.

WILLIAM L. R. EMMET.

Witnesses:
BENJAMIN B. HULL,
ESKIL BERG.